Oct. 10, 1933. C. B. SPASE 1,929,716

CLUTCH PLATE

Filed Oct. 23, 1931

INVENTOR.

Charles B. Spase

BY

Fay, Oberlin & Fay

ATTORNEYS.

Patented Oct. 10, 1933

1,929,716

UNITED STATES PATENT OFFICE 1,929,716

CLUTCH PLATE

Charles B. Spase, Syracuse, N. Y., assignor to Ira Saks, Cleveland, Ohio

Application October 23, 1931. Serial No. 570,540

3 Claims. (Cl. 192—107)

The present invention relating as indicated to a clutch plate pertains more particularly to a novel form of construction for a cushioned disc especially adapted to be used in the transmission mechanism of automotive vehicles and other mechanical devices using clutches.

An object of my invention is to provide a clutch plate which shall effect an even and smooth engagement between the fly wheel and pressure plate of a clutch mechanism. It is a further object to provide means whereby the friction facing rings will be more securely retained upon the clutch disc, and another object is to provide a form of construction wherein excessive fibre strains due to the repetition of bending forces upon the clutch disc will be substantially obviated. Objects and advantages additional to those above enumerated shall become apparent as the description proceeds. To the accomplishment of the foregoing and related ends, said invention, then, consists of the means hereinafter fully described and particularly pointed out in the claims.

Figure 1:
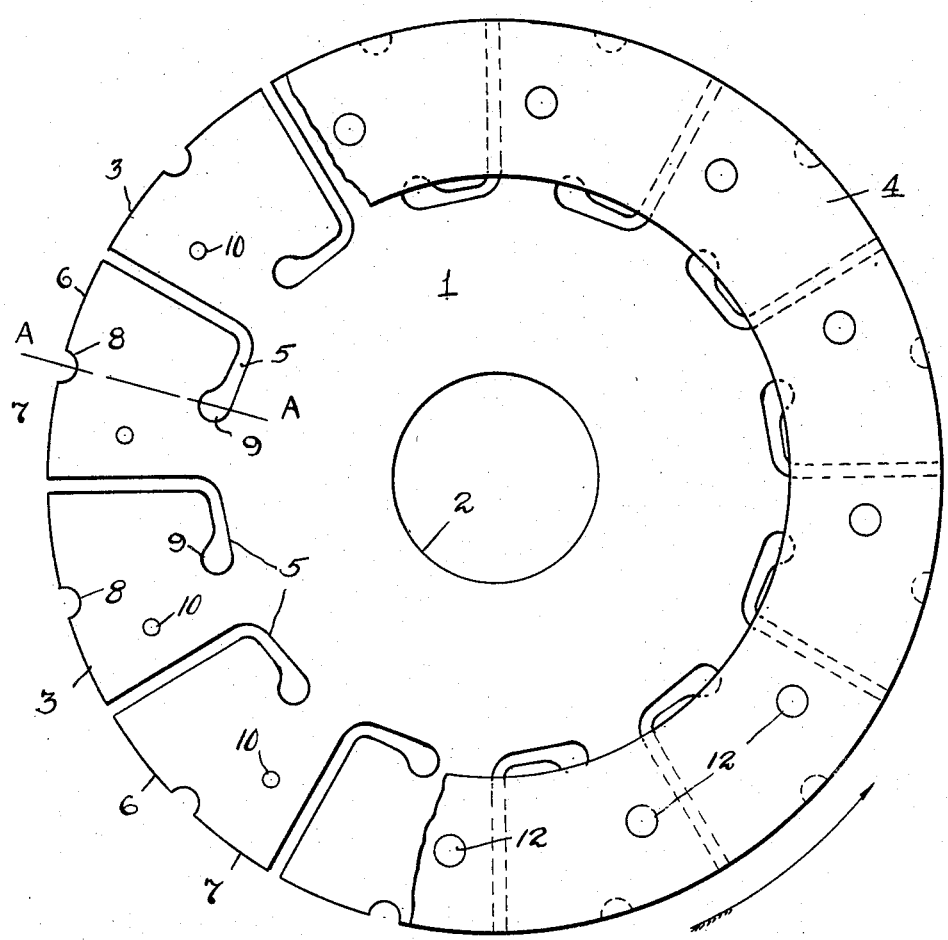
Figure 2:
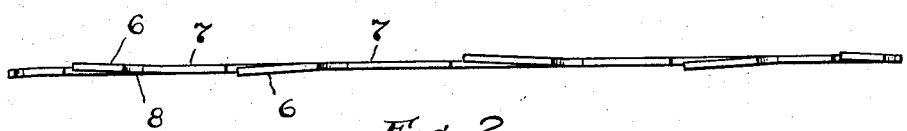

The annexed drawing and the following description set forth in detail certain structure embodying the invention, such disclosed means constituting, however, but one of various structural forms in which the principle of the invention may be used:

In said annexed drawing:

Fig. 1 is a plan view, with a portion of the facing ring cut away, showing a clutch plate constructed according to the principles of my invention. Fig. 2 is a developed section of the periphery of the disc shown in Fig. 1.

Referring more particularly to the drawing, the clutch plate consists of the disc 1 having a central circular opening for the reception of a splined hub (not shown) which may be suitably riveted, welded, or bolted to the disc. The outer portion of the disc 1 is composed of a plurality of sectors 3 to which a pair of friction facing rings 4 are secured. Each one of the sectors 3 is separated from the adjoining sector by an L-shaped slot 5. The arrow at the top of Fig. 1 denotes the direction of rotation of the clutch plate, and it will be noted that the inner arcuate portions of the L-shaped slot extend in the same direction as the rotation of the plate.

The sectors 3 are composed of an offset portion 6 and a flat portion 7. Directing attention to Fig. 2, it will be seen that the offset portions 6 are alternately bent in opposite directions, so that each one of the facing rings 4 will have a series of high and low spots around their contacting surfaces. The flat portions 7 are placed in a position precedent to the offset portions 6 in relation to the direction of rotation of the plate. By virtue of this form of construction it will be seen that the sectors, having their offset portions extending away from the direction of rotation, will initially engage between the drive wheel and pressure plate somewhat similar to a wedging action, thus obviating the usual disc vibration during the initial engagement of the clutch. When full pressure of the clutch is exerted upon the plate, that is, when the clutch mechanism has obtained complete engagement, the offset portion 6 shall be conformed to the radial plane of the flat portion 7 and of the disc 1. It will thus be seen that the offset portions 6 undergo considerable bending stresses during the alternate release and engagement of the clutch mechanism. The resultant fibre stresses which will be set up in the metal of the disc reach a maximum at a region substantially along the line AA. In order to prevent the inception of failure of the metal and cracks due to fatigue, I provide the semi-circular indentation 8 on the periphery of sector 3 and the indented enlargement 9 on the inner end of the L-shaped slot 5.

The friction facing rings 4 are riveted by means of rivets 12 passing through the holes 10 in the flat portions 7. A single rivet therefore serves to secure both the facing rings to the disc. Furthermore, by means of riveting the flat sections 7 to the friction material, there results a flat contact with the disc over a considerable area so that the frictional adhesion of the facing rings 4 may be utilized in effecting a more secure retention of the friction materials in the disc.

Inasmuch as the offset portions 6 are substantially isolated from the body of the disc 1, there is also permitted a better manufacturing control over the amount of offset in the sectors, thus maintaining greater precision and uniformity which are properties highly essential to non-vibrational operation of the clutch plate.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In a clutch plate, a disc having a plurality of peripheral sectors, L-shaped slots between said sectors, the latter being composed of a flat portion and a laterally offset portion, said offset portions being bounded by said slots, and said flat portions preceding said offset portions in the direction of rotation of said plate, and indentions on the inner and outer margins of said sectors at points of maximum bending stress, friction facing rings secured to each side of said disc and rivets securing said facing rings to said flat portions.

2. In a clutch plate, a disc having a plurality of peripheral sectors, said sectors being composed of a flat portion lying in the plane of said disc and a portion contiguous to said flat portion and slightly angularly inclined in a circumferential direction from the plane of said disc, said inclined portions being substantially equal in area to said flat portions, said flat portions preceding said inclined portions in the direction of rotation of said plate, and indentations on the outer periphery of said disc at points on the radial line juncture of said flat portions and said inclined portions.

3. In a clutch plate, a disc having a plurality of peripheral sectors, said sectors being composed of a flat portion lying in the plane of said disc and a portion contiguous to said flat portion and slightly angularly inclined in a circumferential direction from the plane of said disc, said inclined portions being substantially equal in area to said flat portions, said flat portions preceding said inclined portions in the direction of rotation of said plate, L-shaped slots between said sectors, said inclined portions being bounded by said slots, and indentations on the outer periphery of said disc and on the inner end of said slots, said indentations being disposed upon the radial line of juncture of said flat portions and said inclined portions.

CHARLES B. SPASE.